United States Patent
Aissi et al.

(10) Patent No.: US 8,102,901 B2
(45) Date of Patent: Jan. 24, 2012

(54) TECHNIQUES TO MANAGE WIRELESS CONNECTIONS

(75) Inventors: Selim Aissi, Beaverton, OR (US); Uma Gadamsetty, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1001 days.

(21) Appl. No.: 11/070,489

(22) Filed: Mar. 1, 2005

(65) Prior Publication Data
US 2006/0198448 A1     Sep. 7, 2006

(51) Int. Cl.
*H04B 1/38*     (2006.01)
(52) U.S. Cl. ........ 375/219; 375/220; 375/222; 375/356; 375/260
(58) Field of Classification Search .................. 375/219, 375/220, 356, 260, 222; 709/203; 455/423, 455/418; 370/439
See application file for complete search history.

(56) References Cited

U.S. PATENT DOCUMENTS

| | | | |
|---|---|---|---|
| 2002/0068559 A1* | 6/2002 | Sharma et al. | 455/423 |
| 2002/0108038 A1* | 8/2002 | Tanaka et al. | 713/169 |
| 2002/0147766 A1* | 10/2002 | Vanska et al. | 709/203 |
| 2005/0058144 A1* | 3/2005 | Ayyagari et al. | 370/401 |
| 2006/0090023 A1* | 4/2006 | Olsen et al. | 710/107 |

* cited by examiner

*Primary Examiner* — Kabir A Timory
(74) *Attorney, Agent, or Firm* — Kacvinsky Daisak, PLLC (57) ABSTRACT

A system, apparatus, method and article to manage wireless connections are described. The apparatus may include a connection management module to automatically form a first connection between a first mobile device and a second mobile device, and a second connection between the second mobile device and a fixed device, wherein the first mobile device is to communicate information with the fixed device using the first and second connections. Other embodiments are described and claimed.

20 Claims, 5 Drawing Sheets

TECHNIQUES TO MANAGE WIRELESS CONNECTIONS

BACKGROUND

A wireless device may be arranged to communicate information using a wireless medium, such as radio-frequency (RF) spectrum. In some cases, the operations needed to establish the connection over the wireless medium may be relatively complex. Techniques to reduce the complexity of managing wireless connections may facilitate use of the wireless device. Consequently, improvements in managing wireless connections may improve the use and performance of a wireless device or network.

DETAILED DESCRIPTION

Figure 1:
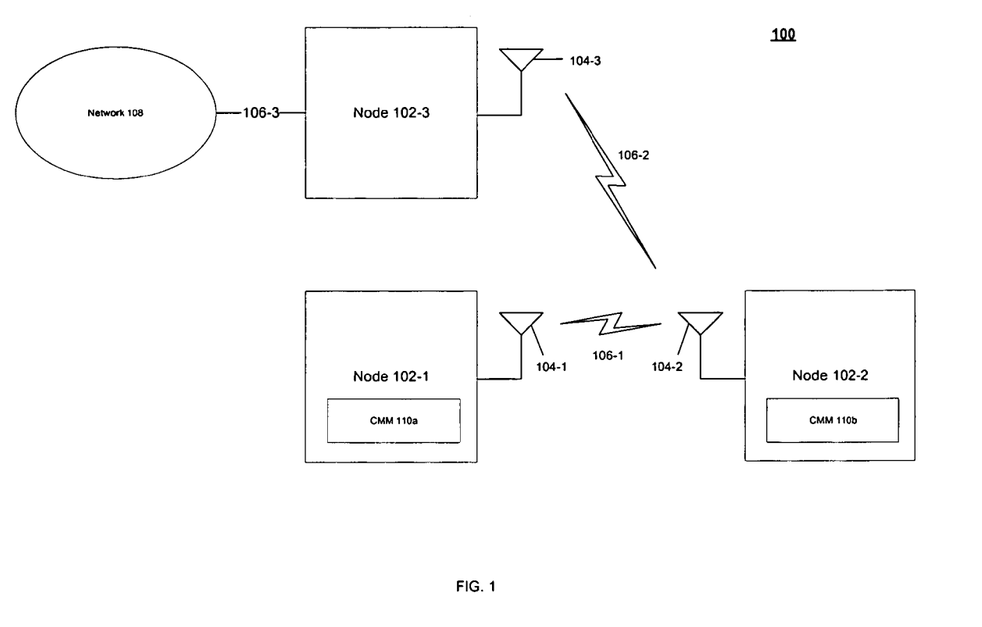
FIG. 1 illustrates a block diagram of a system in accordance with one embodiment.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, notebook computer, handheld computer, telephone, cellular telephone, personal digital assistant (PDA), combination cellular telephone and PDA, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information is used herein in a very general sense and may refer to any data representing content meant for a user, such as voice information, video information, audio information, text information, numerical information, alphanumeric symbols, graphics, images, symbols, and so forth. Control information is also used herein in a very general sense and may refer to any data representing commands, instructions or control words meant for an automated system. For example, control information may be used to route media information through a system, or instruct a node to process the media information in a certain manner. The embodiments are not limited in this context.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. The embodiments are not limited in this context.

System 100 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, for example, system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, system 100 may include one or more wireless nodes arranged to communicate information over one or more types of wireless communication media, sometimes referred to herein as wireless shared media. An example of a wireless communication media may include portions of a wireless spectrum, such as the RF spectrum. The wireless nodes may include components and interfaces suitable for communicating information signals over the designated wireless spectrum, such as one or more antennas, wireless transmitters/receivers ("transceivers"), amplifiers, filters, control logic, and so forth. The embodiments are not limited in this context.

Some embodiments may be directed to managing connections for a wireless network, such as system 100. More particularly, the embodiments may attempt to provide and manage data communication connections between a mobile device (e.g., a notebook computer) and a cellular radiotelephone system accessed via a handheld device (e.g., a cellular telephone). In one embodiment, for example, a secure connection may be established between the notebook computer and the cellular telephone using various personal area network (PAN) techniques. The cellular telephone may provide access to data communication services over the cellular radiotelephone system. In this manner, a user with a notebook computer may have access to seamless data communication services over a PAN and wireless wide area network (WWAN) using a cellular telephone. This may be particularly desirable in the absence of more conventional data communication service providers, such as a wireless local area network (WLAN), for example. The embodiments are not limited in this context.

In some embodiments the connections may be managed by a connection management module (CMM). In one embodiment, for example, the CMM may be arranged to automatically form a first connection between a first mobile device and a second mobile device, and a second connection between said second mobile device and a fixed device. The term "automatically" as used herein may refer to performing operations without user intervention or with limited user intervention. The first mobile device may communicate information with the fixed device using the first and second connections. In one embodiment, the first and second mobile devices may each include a single button to initiate forming the first and second connections. The embodiments are not limited in this context.

Referring again to FIG. 1, system 100 may include one or more nodes 102-1-n. Although FIG. 1 is shown with a limited number of nodes in a certain topology, it may be appreciated that system 100 may include more or less nodes in any type of topology as desired for a given implementation. The embodiments are not limited in this context.

In one embodiment, system 100 may include nodes 102-1, 102-2. Nodes 102-1, 102-2 may each comprise, for example, mobile devices having wireless capabilities. Examples for nodes 102-1, 102-2 may include a computer, server, workstation, notebook computer, handheld computer, telephone, cellular telephone, personal digital assistant (PDA), combination cellular telephone and PDA, and so forth. The embodiments are not limited in this context.

In one embodiment, for example, node 102-1 may comprise a mobile device, such as a notebook computer. Although some embodiments may be described with mobile device 102-1 implemented as a notebook computer by way of example, it may be appreciated that other embodiments may be implemented using other wireless devices as well. The embodiments are not limited in this context.

In one embodiment, for example, node 102-2 may comprise a mobile device, such as a cellular telephone. Although some embodiments may be described with mobile device 102-2 implemented as a cellular telephone by way of example, it may be appreciated that other embodiments may be implemented using other wireless devices as well. The embodiments are not limited in this context.

In one embodiment, mobile devices 102-1, 102-2 may communicate media and control information using wireless communications medium 106-1. Mobile devices 102-1, 102-2 may each comprise a wireless transceiver and antennas 104-1, 104-2, respectively. Examples for antennas 104-1, 104-2 may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth. Although mobile devices 102-1, 102-2 are shown in FIG. 1 with single antennas 104-1, 104-2, respectively, it may be appreciated that wireless devices 102-1, 102-2 may also include multiple antennas. The use of multiple antennas may be used to provide a spatial division multiple access (SDMA) system or a multiple-input multiple-output (MIMO) system, for example. The embodiments are not limited in this context.

Communications between mobile devices 102-1, 102-2 may be performed in accordance with a number of wireless protocols. Examples of wireless protocols may include various wireless local area network (WLAN) protocols, including the IEEE 802.xx series of protocols, such as IEEE 802.11a/b/g/n, IEEE 802.16, IEEE 802.20, and so forth. Other examples of wireless protocols may include various WWAN protocols, such as Global System for Mobile Communications (GSM) cellular radiotelephone system protocols with General Packet Radio Service (GPRS), Code Division Multiple Access (CDMA) cellular radiotelephone communication systems with 1xRTT, Enhanced Data Rates for Global Evolution (EDGE) systems, and so forth. Further examples of wireless protocols may include wireless PAN protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles (collectively referred to herein as "Bluetooth Specification"), and so forth. Other suitable protocols may include Ultra Wide Band (UWB), Digital Office (DO), Digital Home, Trusted Platform Module (TPM), ZigBee, and other protocols. The embodiments are not limited in this context.

In one embodiment, for example, mobile devices 102-1, 102-2 may be arranged with the appropriate hardware, software and radio/air interfaces to communicate data using a wireless PAN technique, such as Bluetooth, for example. Although some embodiments may be described with mobile devices 102-1, 102-2 implemented as Bluetooth devices by way of example, it may be appreciated that other embodiments may be implemented using other wireless devices as well. The embodiments are not limited in this context.

In one embodiment, system 100 may include node 102-3. Node 102-3 may comprise, for example, a fixed station having wireless capabilities. Examples for node 102-3 may include a wireless access point (AP), base station or node B, router, switch, hub, gateway, and so forth. In one embodiment, for example, node 102-3 may comprise a base station or node B for a cellular telephone. Although some embodiments may be described with node 102-3 implemented as a base station or node B by way of example, it may be appreciated that other embodiments may be implemented using other wireless devices as well. The embodiments are not limited in this context.

In one embodiment, mobile device 102-2 and fixed station 102-3 may comprise part of a cellular communication system. Examples of cellular communication systems may include CDMA cellular radiotelephone communication systems, GSM cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, third generation (3G) systems such as Wideband CDMA (WCDMA), CDMA-2000, Universal Mobile Telephone System (UMTS) cellular radiotelephone systems compliant with the Third-Generation Partnership Project (3GPP), and so forth. Communications between mobile device 102-2 and fixed station 102-3 may be performed over wireless communication medium 106-2 in accordance with a number of wireless protocols suitable for a given type of cellular system.

In addition to voice communication services, mobile device 102-2 and fixed station 102-3 may communicate using a number of different data communication services. Examples of cellular data communication systems offering data communication services may include a GSM/GPSR system, CDMA/1xRTT system, EDGE system, and so forth. The embodiments are not limited in this respect.

In one embodiment, for example, mobile device 102-2 and fixed station 102-3 may be arranged with the appropriate hardware, software and radio/air interfaces to perform data communications in accordance with a WWAN technique, such as GSM/GPRS, for example. Although some embodiments may be described with nodes 102-2, 102-3 implemented as GSM/GPSR devices by way of example, it may be appreciated that other embodiments may be implemented using other wireless devices as well. The embodiments are not limited in this context.

In one embodiment, system 100 may include network 108 connected to node 102-3 by wired communications medium 106-3. Network 108 may comprise part of the same cellular system as mobile device 102-2 and fixed station 102-3, and may further include additional cellular system nodes such as mobile stations, base stations, radio network controllers (RNC), mobile services switching centers (MSC), and so forth. In addition, network 108 may comprise additional nodes and connections to other networks, including a voice/data network such as the Public Switched Telephone Network (PSTN), a packet network such as the Internet, a LAN, a metropolitan area network (MAN), a WAN, enterprise networks, and so forth. The embodiments are not limited in this context.

In general operation, system 100 may provide data communication services from mobile device 102-1 (e.g., a notebook computer) using a cellular radiotelephone system (e.g., mobile device 102-2 and fixed station 102-3). For example, a secure connection may be established between mobile devices 102-1, 102-2 using a PAN technique (e.g., Bluetooth). Mobile device 102-2 (e.g., a cellular telephone) may provide access to data communication services over a cellular radiotelephone system (e.g., GSM/GPRS) via fixed station 102-3 (e.g., a base station). In this manner, a user may use mobile device 102-1 to seamlessly access data communication services using mobile device 102-2 and a WWAN. This may be particularly desirable when alternative data communication service providers, such as a WLAN, are not available. The embodiments are not limited in this context.

In order to form a data communication connection between mobile device 102-1 and fixed station 102-3, a secure connection between mobile devices 102-1, 102-2 may need to be established. To form the secure connection, a set of discovery and authentication operations may need to be performed. Depending on the type of security protocol used to form the connection, such discovery and authentication operations may be relative complex. For example, assume discovery operations are performed in accordance with the Bluetooth Specification. During Bluetooth discovery operations, two or more Bluetooth devices may agree to communicate with one another. This may occur by placing one of the devices in a discoverable mode. When in discoverable mode, a Bluetooth device may be discoverable by other Bluetooth devices. The other Bluetooth device may be placed in a discovery mode. When in discovery mode, a device may discover other Bluetooth devices. The device in discovery mode searches for devices in discoverable mode, and when located, performs authentication operations to authenticate the identity of the discovered device. When authentication operations are completed, the two devices form a trusted relationship or trusted pair. When one device recognizes another device in an established trusted pair, each device automatically accepts subsequent communications, bypassing the discovery and authentication process that normally occurs during Bluetooth interactions.

Conventional techniques to establish data communication connections between mobile devices, however, may be unsatisfactory for a number of reasons. For example, a user may have difficulty understanding which of the pair of devices needs to be placed in a discovery mode, and which needs to be placed in a discoverable mode. In another example, a user may have difficulty placing each device in their respective modes. This may occur since placing a device in one of the various modes typically involves software and menu settings, and therefore may require a user to traverse multiple sets of embedded menus. In yet another example, during authentication operations, a user may need to enter an authentication code into the device placed in discovery mode, as well as the device placed in discoverable mode. This may require the user to perform multiple, and potentially unnecessary, authentication operations. Furthermore, this may require a user to remember a given authentication code used for one or both devices. As authentication codes are becoming longer to provide enhanced security, remembering a particular authentication code may become increasingly difficult. As a result, the number and complexity of conventional discovery and authentication operations may reduce system performance, as well as overall user convenience and satisfaction.

Some embodiments may solve these and other problems. In one embodiment, for example, mobile devices 102-1, 102-2 may include connection management modules (CMM) 110a, 110b, respectively. CMM 110a, 110b may be arranged to manage data communication connections for mobile devices 102-1, 102-2. For example, CMM 110a, 110b may cooperate or interact to form a secure connection between mobile devices 102-1, 102-2 over wireless communications medium 106-1. CMM 110a, 110b may form the secure connection by performing discovery and authentication operations in accordance with a given PAN technique. CMM 110a, 110b may also provide configuration parameters needed for communication with a WWAN data communication network. CMM 110a, 110b may reduce the number and complexity of the operations associated with managing data communication connections between multiple wireless devices. Consequently, CMM 110a, 110b may potentially improve performance of one or more nodes 102-1-n in particular, and the overall performance of system 100 in general. Accordingly, a user may realize enhanced products and services.

Figure 2:
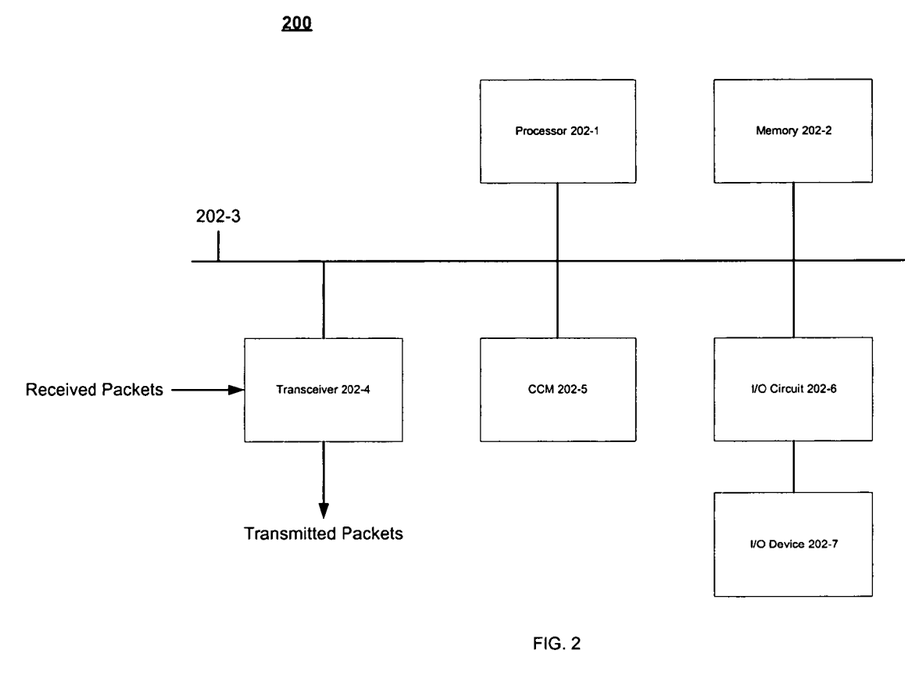
FIG. 2 illustrates a block diagram of a first node in accordance with one embodiment.

FIG. 2 illustrates a block diagram of a node in accordance with one embodiment of the system. FIG. 2 illustrates a block diagram of a node 200 suitable for use with system 100 as described with reference to FIG. 1, such as one or more nodes 102-1-n, for example. In one embodiment, for example, node 200 may be representative of mobile device 102-1. The embodiments are not limited, however, to the example given in FIG. 2.

As shown in FIG. 2, node 200 may comprise multiple elements, such as elements 202-1-p. Elements 202-1-p may comprise, or be implemented as, one or more circuits, components, registers, processors, software subroutines, modules, or any combination thereof, as desired for a given set of design or performance constraints. Although FIG. 2 shows a limited number of elements by way of example, it can be appreciated that more or less elements may be used in element 202-1-p as desired for a given implementation. The embodiments are not limited in this context.

In one embodiment, node 200 may include an element 202-1. In one embodiment, for example, element 202-1 may comprise a processor. For example, processor 202-1 may be implemented as a general purpose processor, such as a general purpose processor made by Intel® Corporation, Santa Clara, Calif. In another example, processor 202-1 may include a dedicated processor, such as a controller, microcontroller, embedded processor, a digital signal processor (DSP), a field programmable gate array (FPGA), a programmable logic device (PLD), a network processor, an I/O processor, and so forth. When node 200 is implemented for mobile device 102-1, such as a notebook computer, processor 202-1 may comprise a general purpose processor, such as an Intel Pentium® M processor, for example. The embodiments, however, are not limited in this context.

In one embodiment, node 200 may include an element 202-2. In one embodiment, for example, element 202-2 may comprise memory. Memory 202-2 may include any machine-readable or computer-readable media capable of storing data, including both volatile and non-volatile memory. For example, memory 202-2 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 202-2 may be included on the same integrated circuit as processor 202-1, or alternatively some portion or all of memory 202-2 may be disposed on an integrated circuit or other medium, for example a hard disk drive, that is external to the integrated circuit of processor 202-1. The embodiments are not limited in this context.

In one embodiment, node 200 may include an element 202-4. In one embodiment, for example, element 202-4 may comprise a wireless or radio transceiver. Wireless transceiver 202-4 may comprise any transceiver suitable for a particular wireless system. In one embodiment, the transceiver may be implemented as part of a chip set (not shown) associated with processor 202-1. As used herein, the term "transceiver" may be used in a very general sense to include a transmitter, a receiver, or a combination of both. The embodiments are not limited in this context.

In one embodiment, node 200 may include an element 202-5. In one embodiment, for example, element 202-5 may be representative of CMM 110a of mobile device 102-1 as described with reference to FIG. 1. CMM 202-5 may provide and manage data communication connections for mobile device 102-1. For example, CMM 202-5 may form a secure connection between mobile device 102-1 and other wireless devices. CMM 202-5 may form the secure connection in cooperation with CMM 302-5 of node 300, as described with reference to FIG. 3. In one embodiment, for example, CMM 202-5 may form the secure connection by performing discovery and authentication operations on behalf of mobile device 102-1 in accordance with a given wireless protocol, security technique, and underlying transport layer. Once a secure connection has been established between mobile devices 102-1, 102-2, CMM 202-5 may also assist in configuring a data communication connection between mobile device 102-2 and fixed station 102-3, as well as a data communication connection between mobile device 102-1 and fixed station 102-3 via mobile device 102-2. The embodiments are not limited in this context.

In one embodiment, node 200 may include elements 202-6, 202-7. In one embodiment, for example, element 202-6 may comprise an I/O circuit, and element 202-7 may comprise an I/O device. I/O circuit 202-6 may control a number of I/O devices 202-7. Examples of I/O circuit 202-6 may include a disc controller, video controller, audio controller, keyboard controller, mouse controller, and so forth. Examples of I/O device 202-7 may include a display, monitor, keyboard, keypad, mouse, touchpad, touch screen, pointer, speakers, and so forth. The embodiments are not limited in this context.

In one embodiment, elements 202-1-$p$ may be connected by bus 202-3. When node 200 is implemented as part of mobile device 102-1, bus 202-3 may comprise a system bus such as a peripheral component interconnect (PCI) bus defined by a PCI Local Bus Specification. The embodiments are not limited in this context.

Figure 3:
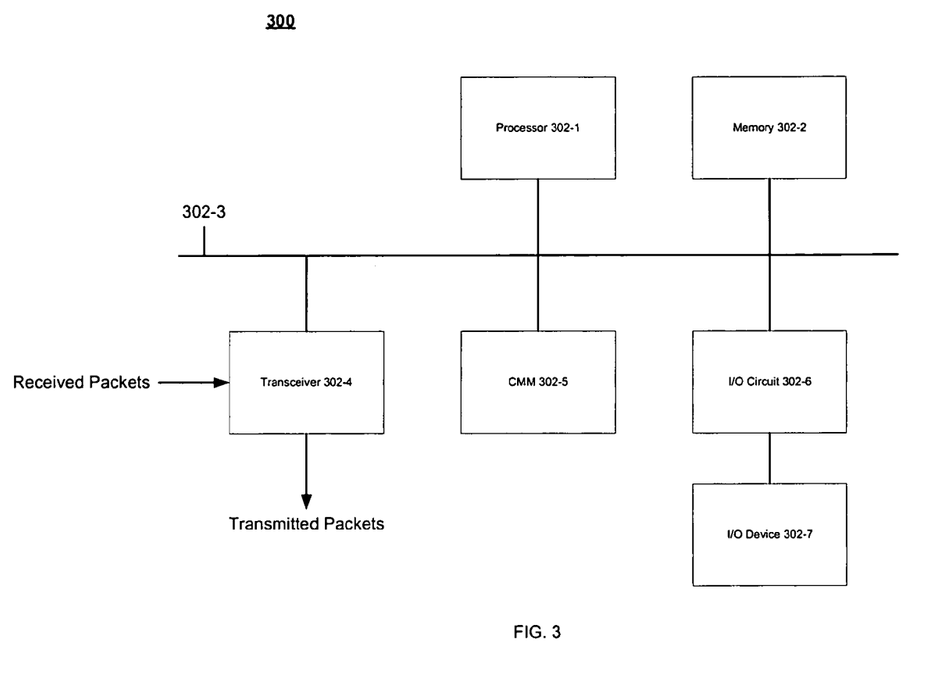
FIG. 3 illustrates a block diagram of a second node in accordance with one embodiment.

FIG. 3 illustrates a block diagram of a node in accordance with one embodiment of the system. FIG. 3 illustrates a block diagram of a node 300 suitable for use with system 100 as described with reference to FIG. 1, such as one or more nodes 102-1-$n$, for example. In one embodiment, for example, node 300 may be representative of mobile device 102-2. The embodiments are not limited, however, to the example given in FIG. 3.

As shown in FIG. 3, node 300 may comprise multiple elements, such as elements 302-1-$q$. Elements 302-1-$q$ may comprise, or be implemented as, one or more circuits, components, registers, processors, software subroutines, modules, or any combination thereof, as desired for a given set of design or performance constraints. Although FIG. 3 shows a limited number of elements by way of example, it can be appreciated that more or less elements may be used in element 302-1-$q$ as desired for a given implementation. The embodiments are not limited in this context.

In one embodiment, node 300 may have a similar structure to node 200. For example, elements 302-1-7 of node 300 may be similar to corresponding elements 202-1-7 as described with reference to node 200, with some potential variation as described further below.

In a first variation, when implemented as a wireless device such as a cellular telephone, processor 302-1 may be implemented as a less powerful processor relative to processor 202-1, which is more appropriate for the form factor, processing performance, heat tolerances, power resources, application types, and other design constraints suitable for such devices. For example, when node 300 is implemented for mobile device 102-2, such as a cellular telephone, processor 302-1 may comprise an Intel Personal Communications Architecture (PCA) processor based on an Intel XScale® (XSC) microarchitecture, such as an Intel PXA255, PXA 26x, PXA 27x, and so forth. The embodiments are not limited in this context.

In a second variation, element 302-5 may be representative of CMM 110b of mobile device 102-2 as described with reference to FIG. 2. CMM 302-5 may provide and manage data communication connections for mobile device 102-2. In one embodiment, for example, CMM 302-5 may form a secure connection between mobile device 102-2 and other wireless devices. CMM 302-5 may form the secure connection in cooperation with CMM 202-5 of node 200, as described with reference to FIG. 2. In one embodiment, for example, CMM 302-5 may form the secure connection by performing discovery and authentication operations on behalf of mobile device 102-2 in accordance with a given wireless protocol, security technique, and underlying transport layer. Once a secure connection has been established between mobile devices 102-1, 102-2, CMM 302-5 may also assist in configuring a data communication connection between mobile device 102-2 and fixed station 102-3, as well as a data communication connection between mobile device 102-1 and fixed station 102-3 via mobile device 102-2. The embodiments are not limited in this context.

In general operation, CMM 205-5, 302-5 may cooperate to provide and manage data communication connections between mobile devices 102-1, 102-2. In addition, CMM 205-5, 302-5 may cooperate to provide and manage data communication connections between mobile device 102-1 and fixed station 102-3, as well as between mobile device 102-2 and fixed station 102-3. CMM 205-5, 302-5 may be described in more detail with reference to FIGS. 4 and 5.

Figure 4:
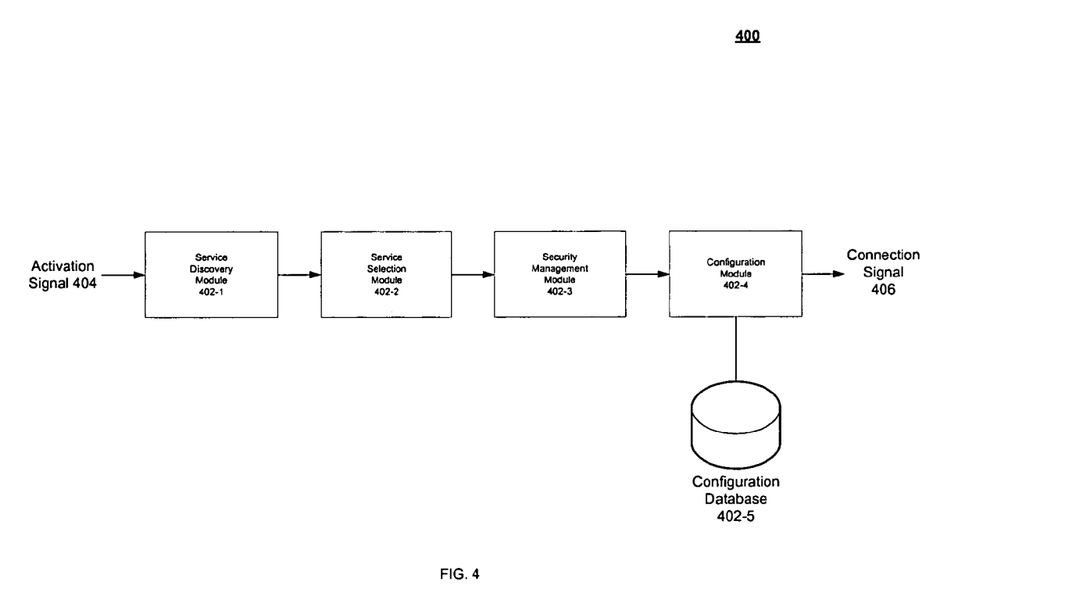
FIG. 4 illustrates a block diagram of a connection management module in accordance with one embodiment.

FIG. 4 illustrates a block diagram of a node in accordance with one embodiment of the system. FIG. 4 illustrates a block diagram of a CMM 400 suitable for use with system 100 as described with reference to FIG. 1. In one embodiment, for example, CMM 400 may be representative of CMM 202-5 when implemented as part of mobile device 102-1. In one embodiment, for example, CMM 400 may be representative of CMM 302-5 when implemented as part of mobile device 102-2. The embodiments are not limited, however, to the example given in FIG. 4.

As shown in FIG. 4, CMM 400 may comprise multiple elements, such as elements 402-1-r. Elements 402-1-r may comprise, or be implemented as, one or more circuits, components, registers, processors, software subroutines, modules, or any combination thereof, as desired for a given set of design or performance constraints. Although FIG. 4 shows a limited number of elements by way of example, it can be appreciated that more or less elements may be used in element 402-1-r as desired for a given implementation. The embodiments are not limited in this context.

In one embodiment, CMM 400 may include a service discovery module (SDM) 402-1. SDM 402-1 may receive as input an activation signal 404. Activation signal 404 may be representative of a signal received from a user via a software or hardware activator. Activation signal 404 may cause SDM 402-1 to begin operations needed to form a data communication connection between mobile devices 102-1, 102-2, mobile device 102-1 and fixed station 102-3, and mobile device 102-2 and fixed station 102-3. The embodiments are not limited in this context.

Techniques may be implemented to reduce the complexity of the user interface between the user and the CMM application through the use of hardware or software activators to generate activation signal 404. For example, a user may be offered the capability of initiating CMM operations by selecting a software activator, such as a button, icon, or menu item, to generate activation signal 404. In another example, a user may use a hardware activator including a hardware structure, such as a dedicated button, key, or multiple keys in combination, to generate activation signal 404. In yet another example, mobile devices 102-1, 102-2 may include a voice recognition engine (not shown), and a user may generate activation signal 404 using voice commands as received by the voice recognition engine. The particular activator used to generate activation signal 404 may vary in accordance with a number of factors, to include a form factor for the device, the type of input device (e.g., keypad, keyboard, mouse), the screen area for the display, and so forth. The embodiments are not limited in this context.

In one embodiment, for example, the activator may comprise a single hardware structure such as a button or key on each of mobile devices 102-1, 102-2. For example, a user may press a button on mobile device 102-1 to initiate a secure connection with mobile device 102-2. The user may press a button on mobile device 102-2 to complete the secure connection. Once the activation button is activated on mobile devices 102-1, 102-2, CMM 400 may automatically form a first connection between mobile devices 102-1, 102-2 without any further user intervention. In one embodiment, for example, the first connection may comprise a secure connection. Once the first connection between mobile devices 102-1, 102-2 has been established, a second connection may be established between mobile device 102-2 and fixed station 102-3. In one embodiment, for example, the second connection may comprise a data communication connection over a WWAN. Once the data communication connection is established between mobile device 102-2 and fixed station 102-3, mobile device 102-1 and fixed station 102-3 may communicate over the first and second connections. Consequently, the use of a single hardware structure on each of mobile devices 102-1, 102-2 may significantly reduce the complexity of forming a data communication connection between the various nodes of system 100.

When implemented as part of mobile device 102-1, SDM 402-1 of CMM 400 may place mobile device in a discovery mode to begin scanning for wireless devices and associated capabilities within communication range of mobile device 102-1 in response to activation signal 404. For example, SDM 402-1 may place mobile device 102-1 in a Bluetooth discovery mode to discover any Bluetooth devices within range of mobile device 102-1. In another example, SDM 402-1 may scan for infrared devices within detectable range of mobile device 102-1. In yet another example, SDM 402-1 may scan for other notebook computers with wireless capabilities within detectable range of mobile device 102-1. SDM 402-1 may continue to scan for available devices until a terminating condition has occurred, such as discovering at least one device, exceeding a timeout value, receiving an explicit user command to terminate service discovery, and so forth. Once SDM 402-1 discovers all of the devices with wireless capabilities within communication range of mobile device 102-1, SDM 402-1 may pass the list of devices and associated capabilities to service selection module (SSM) 402-2.

When implemented as part of mobile device 102-2, SDM 402-1 of CMM 400 may place mobile device 102-2 in a discoverable mode in response to activation signal 404. When in discoverable mode, mobile device 102-2 may broadcast device information so that mobile device 102-2 may be discoverable by other devices operating in discovery mode, such as mobile device 102-1. For example, assume mobile devices 102-1, 102-2 may operate in accordance with the Bluetooth Specification. When in discoverable mode, mobile device 102-2 may broadcast a Bluetooth name and Bluetooth address to mobile device 102-1.

When implemented as part of mobile device 102-1, SSM 402-2 of CMM 400 may receive the list of devices and associated capabilities from SDM 402-1. SSM 402-2 may then display or audibly reproduce the list of devices and associated capabilities to the user via a display or speaker, respectively. Each device may have one or more capability parameters associated with the device. Examples of capability parameters may include type of data connection (e.g., GPRS, EDGE, 1xRTT), a data connection rate (e.g., 19.2 Kbps through 1 Mbps), security features (e.g., 64-bit SSL, 128-bit SSL), data service provider (e.g., Vodafone, Viag Interkom, T-Mobile, E-Plus, Sprint, ATT), type of device (e.g., notebook, cellular telephone, PDA), device owner (e.g., user, spouse, co-worker), and so forth. A user may review the available devices and associated capabilities, and select a device to form the data communications connection. Alternatively, SSM 402-2 may use a selection algorithm to automatically select a device without user intervention in accordance with a set of predefined rules. Once a device has been selected, a device selection signal may be sent to a security management module (SMM) 402-3.

When implemented as part of mobile device 102-1, SMM 402-3 of CMM 400 may receive the device selection signal from SSM 402-2. SMM 402-3 may proceed to form a secure connection with the device indicated by the device selection signal. For example, assume mobile device 102-2 is the selected device. SMM 402-3 may attempt to form a secure connection between mobile devices 102-1, 102-2. To form the secure connection, SMM 402-3 may be arranged to perform authentication operations between mobile devices 102-1, 102-2. For example, assume mobile devices 102-1, 102-2 are arranged to form a secure connection in accordance with the Bluetooth Specification. In the Bluetooth Specification, for example, authentication operations are based on a challenge-response scheme. Further assume CMM 400 of mobile device 102-1 operates as a verifier. The verifier may send a Link Management Protocol (LMP) Packet Data Unit (PDU) (e.g., LMP_au_rand) that contains a random number to a claimant, such as CMM 400 of mobile device 102-2. The random number may operate as the challenge for the claimant. The claimant may calculate a response that is a function of the challenge, a Bluetooth Device Address (BD_ADDR) for the claimant, and a secret key. The claimant may send a response PDU (e.g., LMP_sres) with the calculated response back to the verifier. The verifier then determines whether the response is correct or not. A successful calculation of the authentication response typically requires that two devices share a secret cryptographic key, sometimes referred to as a link key.

In the absence of a common link key, CMM 202-5, 302-5 may perform authentication operations referred to as pairing operations on behalf of mobile devices 102-1, 102-2, respectively. Pairing operations may require use of a Bluetooth Personal Identification Number (PIN) or Bluetooth Passkey (collectively referred to herein as a "Bluetooth PIN"). The Bluetooth PIN may be used to authenticate two Bluetooth devices that do not have a common link key or that have not previously exchanged link keys between each other. The Bluetooth PIN may be used to create a trusted relationship between mobile devices 102-1, 102-2. The Bluetooth PIN is used in the pairing operations to generate the initial link key (e.g., $K_{int}$) that is used for further authentication. Mutual authentication in accordance with LMP authentication may then be performed to authenticate the identity of mobile devices 102-1, 102-2. Once mobile devices 102-1, 102-2 have a common link key and thereby forming a trusted pair or trusted relationship, subsequent communications between mobile devices 102-1, 102-2 may be performed without the normal authentication operations typically associated with Bluetooth interactions, absent changes in the trusted relationship between mobile devices 102-1, 102-2.

As described above, the discovery and authentication operations as defined by the Bluetooth Specification may be relatively complex. A user may initiate a secure connection between mobile devices 102-1, 102-2, however, by merely pressing or activating a single hardware structure, such as a button, a key, or multiple keys pressed in combination. In response to activation signal 404, CMM 400 automatically manages and performs the discovery and authentication operations to form the secure Bluetooth connection between mobile devices 102-1, 102-2. Although some embodiments may be described with mobile devices 102-1, 102-2 forming a secure connection using the Bluetooth Specification, it may be appreciated that other embodiments may be implemented using other protocols as well. The underlying wireless protocol, security technique and transport layer used to form the secure connection may vary in accordance with a desired implementation, and the embodiments are not limited in this context.

Once SMM 402-3 forms a secure connection between mobile devices 102-1, 102-2, SMM 402-3 may send an authentication pass signal to a configuration module (CM) 402-4. CM 402-4 may assist in configuring a data communication connection between mobile device 102-2 and fixed station 102-3, as well as a data communication connection between mobile device 102-1 and fixed station 102-3 via mobile device 102-2.

A data communication connection between mobile device 102-2 and fixed station 102-3 may need certain configuration parameters prior to being established. For example, assume mobile device 102-2 and fixed station 102-3 use GPRS to perform data communications. Fixed station 102-3 typically has an access point name (APN). For mobile device 102-2 to communicate with fixed station 102-3, mobile station 102-2 may need to be configured with the appropriate APN configuration information. In addition, the APN configuration information may vary in accordance with a given GPRS service provider. Furthermore, a given APN may vary in accordance with a type of data communication connection, such as a wireless access protocol (WAP) connection, Internet connection, Intranet connection, and so forth. Potentially adding to the complexity is that mobile device 102-2 typically roams through various GPRS service providers on a relatively frequency basis.

As a result of this complexity, CM 402-4 may have access to a database 402-5. Database 402-5 may store APN configuration information in a data structure accessible by CM 402-4. Due to the limited memory resources available with mobile device 102-2, database 402-5 may be implemented as part of mobile device 102-1 to take advantage of its greater memory resources. An example of a data structure with APN configuration information may be illustrated in the following Table 1.

TABLE 1

| Operator | GPRS APN | User Name | Password | Primary DNS | Secondary DNS |
| --- | --- | --- | --- | --- | --- |
| D2 Vodafone | Web.Vodafone.de | Wv1 | Vodaphone | 139.007.030.125 | 139.007.030.126 |
| O2 Viag Interkom | Internet | Vi1 | Viag | 195.182.096.028 | 195.182.096.061 |
| D1 T-Mobile | Internet.t-dl.de | Td1 | GPRS | 193.254.160.001 | 193.254.160.002 |
| E-Plus | Internet.eplus | Deplus | WAP | 212.023.097.002 | 212.023.097.003 |

Database 402-5 may store a data structure of APN configuration information similar to Table 1. In one embodiment, for example, the data structure for the APN configuration information may comprise an Extensible Markup Language (XML) document. CM 402-4 may access the APN configuration information stored in database 402-5 in response to sequence of configuration events between mobile devices 102-1, 102-2, as described in the following example.

Assume database 402-5 stores APN configuration information in an XML configuration document on mobile device 102-1. CM 402-4 of mobile device 102-2 may generate a configuration detection/change event message to CM 402-4 of mobile device 102-1 in response to a change in GPRS service providers. CM 402-4 of mobile device 102-2 may detect a change in GPRS service providers using a universal plug-and-play (UPnP) technique. Once CM 402-4 of mobile device 102-1 receives the change event message, CM 402-4 may retrieve the APN configuration information appropriate for a given GPRS service provider from the XML document, and send the retrieved information to mobile device 102-2. Alternatively, CMM 400 may cause mobile device 102-1 to push the entire XML configuration document with the GPRS APN configuration information to CM 402-4 of mobile device 102-2. CM 402-4 may use the UPnP Host API interface provided by the mobile device 102-2 service to push the XML configuration document for a given GPRS service provider. CM 402-4 of mobile device 102-2 may then configure the APN for the new GPRS service provider using the APN configuration information provided by CM 402-4 of mobile device 102-1. CM 402-2 of mobile device 102-2 may send an APN configuration completed message to CM 402-2 of mobile device 102-1 once the new APN has been appropriately configured.

The XML configuration document may be updated in a number of different ways. For example, in the case of enterprise users (e.g., Digital Office), the XML configuration document can be updated when mobile device 102-1 is connected to the corporate network. It is expected that corporate information technology (IT) maintains the GPRS APN table in the corporate network to assist enterprise users. The embodiments are not limited in this context.

In the case of non-enterprise users, the WAP and GPRS configuration settings may be configured on mobile device 102-2 before connecting to a WWAN for the first time or while roaming. The common communications framework (CCF) architecture developed by Intel Corporation may address this issue by adopting existing over-the-air (OTA) techniques for configuring the APN configuration parameters on mobile device 102-2. Mobile device 102-1 may maintain various short messaging service (SMS) parameters for various service providers which are required to acquire settings OTA in database 402-5. In addition, database 402-5 may also maintain the APN settings that were acquired OTA in the past. The APN settings may be acquired and configured using SMS in response to various configuration events. For example, the APN parameters may be received in an OTA message by sending an SMS to an OTA settings service number for a given service provider. The message may comprise a special string (e.g. "NokiaWAP"). The acquired APN configuration information may be maintained in database 402-5 in mobile device 102-1 since the number of configurable APNs on mobile device 102-2 is typically product dependent.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
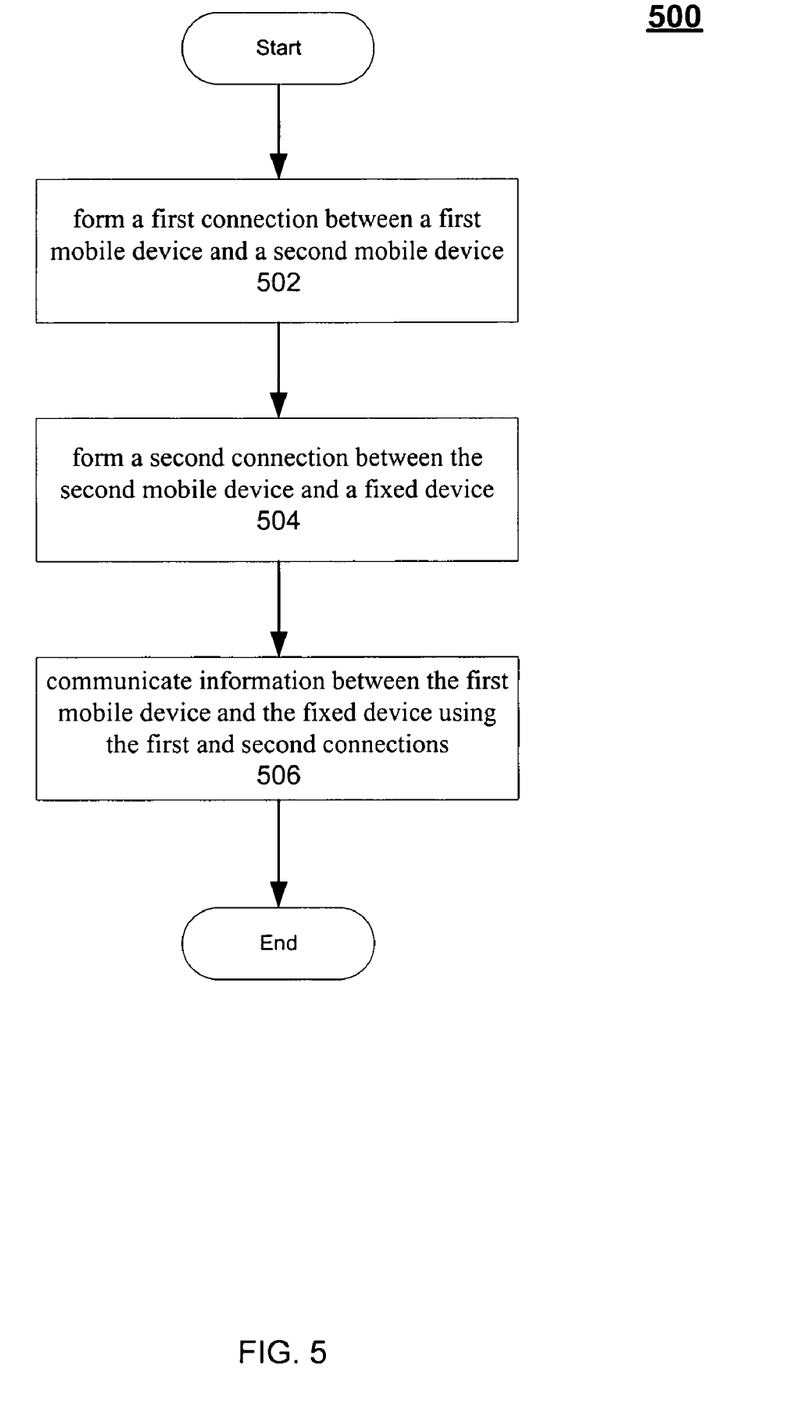
FIG. 5 illustrates a logic diagram in accordance with one embodiment.

FIG. 5 illustrates a logic diagram in accordance with one embodiment. FIG. 5 illustrates a logic flow 500. Logic flow 500 may be representative of the operations executed by one or more structure described herein, such as system 100, node 200, node 300, and/or CMM 400. As shown in logic flow 500, a first connection may be formed between a first mobile device and a second mobile device at block 502. A second connection may be formed between the second mobile device and a fixed device at block 504. Information may be communicated between the first mobile device and the fixed device using the first and second connections at block 506.

In one embodiment, a first activation signal may be generated using a first button on the first mobile device. A second activation signal may be generated using a second button on the second mobile device. The first and second activation signals may initiate forming the first and second connections.

In one embodiment, the first and second connections may be formed without user intervention. Alternatively, the first and second connections may be formed with limited user intervention. The embodiments are not limited in this context.

In one embodiment, a set of wireless devices and their associated capabilities may be discovered within communication range of the first mobile device to form a list of wireless devices. The second mobile device may be selected from the list of wireless devices based on the associated capabilities. The second mobile device may be selected by a user or automatically in accordance with a selection algorithm. The second mobile device may be authenticated to form the first connection. The second mobile device may be configured with the appropriate configuration information to form the second connection.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a connection management module to automatically form a first connection between a first mobile device and a second mobile device, and a second connection between said second mobile device and a fixed device, wherein said first mobile device is to exchange information with said fixed device using said first and second connections and wherein both of the first and second connections are automatically initiated based on a single button press on one or more of the first or second mobile device and said connection management module operative to form said first and second connections without user intervention; said connection management module comprising:
  a service discovery module to discover and identify wireless devices and associated capabilities within communication range of said first mobile device;
  a service selection module to select said second mobile device from the wireless devices identified by the service discovery module based on said associated capabilities;
  a security management module to authenticate said second mobile device to form said first connection; and
  a configuration module to configure said second mobile device with configuration information to form said second connection.

2. The apparatus of claim 1, wherein said first and second mobile devices each include a single button to initiate forming said first and second connections.

3. The apparatus of claim 1, wherein said first connection is a personal area network connection, and said second connection is a wireless wide area network connection.

4. The apparatus of claim 1, wherein said first connection is a secure connection, and said second connection is a data communications connection.

5. The apparatus of claim 1, wherein:
said service discovery module to discover wireless devices and associated capabilities within communication range of said first mobile device in response to an activation signal, and output a list of discovered devices;
said service selection module to receive said list of discovered devices and associated capabilities, select said second mobile device based on said associated capabilities, and output a device selection signal; and
said security management module to receive said device select signal, authenticate said second mobile device to form said first connection, and output an authentication pass signal.

6. The apparatus of claim 1, wherein said authentication operations utilize a personal identification number (PIN) or a passkey.

7. A system comprising:
an antenna;
a transceiver to couple to said antenna; and
a connection management module to couple to said transceiver, said connection management module to automatically form a first connection between a first mobile device and a second mobile device, and a second connection between said second mobile device and a fixed device, wherein said first mobile device is to exchange information with said fixed device using said first and second connections and wherein both of the first and second connections are automatically initiated based on a single button press on one or more of the first or second mobile device and said connection management module operative to form said first and second connections without user intervention;
said connection management module comprising
  a service discovery module to discover and identify wireless devices and associated capabilities within communication range of said first mobile device;
  a service selection module to select said second mobile device from the wireless devices identified by the service discovery module based on said associated capabilities;
  a security management module to authenticate said second mobile device to form said first connection; and
  a configuration module to configure said second mobile device with configuration information to form said second connection.

8. The system of claim 7, wherein said first and second mobile devices each include a single button to initiate forming said first and second connections.

9. The system of claim 7, wherein said first connection is a personal area network connection, and said second connection is a wireless wide area network connection.

10. The system of claim 7, wherein said first connection is a secure connection, and said second connection is a data communications connection.

11. The system of claim 7, wherein:
said service discovery module to discover wireless devices and associated capabilities within communication range of said first mobile device in response to an activation signal, and output a list of discovered devices;
said service selection module to receive said list of discovered devices and associated capabilities, select said second mobile device based on said associated capabilities, and output a device selection signal; and said security management module to receive said device select signal, authenticate said second mobile device to form said first connection, and output an authentication pass signal.

12. The system of claim 7, wherein said authentication operations utilize a personal identification number (PIN) or a passkey.

13. A method, comprising:
discovering and identifying wireless devices and associated capabilities within communication range of a first mobile device;
selecting a second mobile device from the identified wireless devices based on said associated capabilities;
forming a first connection between said first mobile device and said second mobile device;
authenticating said second mobile device to form said first connection;
forming a second connection between said second mobile device and a fixed device;
configuring said second mobile device with configuration information to form said second connection; and
communicating information between said first mobile device and said fixed device using said first and second connections;
wherein both of the first and second connections are automatically initiated based on a single button press on one or more of the first or second mobile device and the first and second connections are formed without user intervention.

14. The method of claim 13, further comprising generating a first activation signal using a first button on said first mobile device, and a second activation signal using a second button on said second mobile device, said first and second activation signals to initiate forming said first and second connections.

15. The method of claim 13, further comprising:
forming a list of wireless devices; and
selecting said second mobile device from said list of wireless devices based on said associated capabilities.

16. The method of claim 13, wherein said authentication operations utilize a personal identification number (PIN) or a passkey.

17. An article comprising a non-transitory computer-readable storage medium containing instructions that if executed by a processor enable a system to:
discover and identify wireless devices and associated capabilities within communication range of a first mobile device,
select a second mobile device from the identified wireless devices based on said associated capabilities,
form a first connection between said first mobile device and said second mobile device,
authenticate said second mobile device to form said first connection, form a second connection between said second mobile device and a fixed device,
configure said second mobile device with configuration information to form said second connection, and
communicate information between said first mobile device and said fixed device using said first and second connections,
wherein both of the first and second connections are automatically initiated based on a single button press on one or more of the first or second mobile device and the first and second connections are formed without user intervention.

18. The article of claim 17, further comprising instructions that if executed enable the system to generate a first activation signal using a first button on said first mobile device, and a second activation signal using a second button on said second mobile device, said first and second activation signals to initiate forming said first and second connections.

19. The article of claim 17, further comprising instructions that if executed enable the system to form a list of wireless devices, and select said second mobile device from said list of wireless devices based on said associated capabilities.

20. The article of claim 17, wherein said authentication operations utilize a personal identification number (PIN) or a passkey.

* * * * *

UNITED STATES PATENT AND TRADEMARK OFFICE
CERTIFICATE OF CORRECTION

PATENT NO. : 8,102,901 B2  
APPLICATION NO. : 11/070489  
DATED : January 24, 2012  
INVENTOR(S) : Selim Aissi et al.

Page 1 of 1

It is certified that error appears in the above-identified patent and that said Letters Patent is hereby corrected as shown below:

On sheet 2 of 5, in Figure 2, Box 202-5, line 1, delete "CCM" and insert -- CMM --, therefor.

In column 16, line 37, in claim 7, delete "comprising" and insert -- comprising: --, therefor.

Signed and Sealed this  
Tenth Day of April, 2012

David J. Kappos  
*Director of the United States Patent and Trademark Office*